(12) United States Patent
Peters et al.

(10) Patent No.: US 9,632,305 B2
(45) Date of Patent: Apr. 25, 2017

(54) LENS CAP ADAPTER FOR IMAGE CAPTURE DEVICE

(71) Applicant: Celestron Acquisition, LLC, Torrance, CA (US)

(72) Inventors: Ron Peters, Long Beach, CA (US); Corey Lee, Monterey Park, CA (US); Eric J. Kopit, Redondo Beach, CA (US); Joseph R. Garrison, Jr., Orange, CA (US)

(73) Assignee: Celestron Acquisition, LLC, Torrance, CA (US)

( * ) Notice: Subject to any disclaimer, the term of this patent is extended or adjusted under 35 U.S.C. 154(b) by 22 days.

(21) Appl. No.: 14/882,814

(22) Filed: Oct. 14, 2015

(65) Prior Publication Data

US 2016/0116731 A1 Apr. 28, 2016

Related U.S. Application Data

(60) Provisional application No. 62/068,551, filed on Oct. 24, 2014.

(51) Int. Cl.
| | |
|---|---|
| G02B 23/00 | (2006.01) |
| G02B 23/24 | (2006.01) |
| G02B 23/16 | (2006.01) |
| G02B 25/00 | (2006.01) |
| H04N 1/00 | (2006.01) |

(Continued)

(52) U.S. Cl.
CPC ......... *G02B 23/2484* (2013.01); *G02B 23/16* (2013.01); *G02B 25/001* (2013.01); *H04N 1/00246* (2013.01); *H04M 1/0264* (2013.01); *H04M 1/21* (2013.01)

(58) Field of Classification Search
CPC ........ G02B 23/00; G02B 23/16; G03B 11/04; G03B 11/041; G03B 11/043; G03B 11/046; G03B 11/048; G03B 11/06
USPC ....... 359/399, 362, 363, 400, 402, 407, 507, 359/511; 396/448, 432, 544
See application file for complete search history.

(56) References Cited

U.S. PATENT DOCUMENTS

| | | | |
|---|---|---|---|
| 2,967,456 A | 1/1961 | Maier | |
| 2002/0171924 A1* | 11/2002 | Varner | G02B 23/16 359/363 |

(Continued)

FOREIGN PATENT DOCUMENTS

CN 203365797 U * 12/2013

*Primary Examiner* — Arnel C Lavarias
(74) *Attorney, Agent, or Firm* — Raubvogel Law Office (57) ABSTRACT

An optical device such as a telescope may be connected to a camera through the use of a camera that acts as a lens cap for the optical system. The optical device may have an eyepiece and a housing within which a lens is retained. The adapter may have a cover portion, a housing attachment feature, an eyepiece attachment feature, and one or more camera attachment features. The cover portion may cover an end of the housing, and may have an imaging aperture. The housing attachment feature may be positioned at a periphery of the cover portion, and may attach the cover portion to the housing. The eyepiece attachment feature may be positioned proximate the imaging aperture to attach the cover portion to the eyepiece. The camera attachment features may facilitate attachment of a camera to the cover portion in alignment with the imaging aperture.

20 Claims, 9 Drawing Sheets

(51) Int. Cl.
*H04M 1/02* (2006.01)
*H04M 1/21* (2006.01)

(56) References Cited

U.S. PATENT DOCUMENTS

| | | | |
|---|---|---|---|
| 2010/0065452 A1* | 3/2010 | Ottl | G03B 11/041 |
| | | | 206/316.1 |
| 2012/0320340 A1* | 12/2012 | Coleman, III | A61B 3/14 |
| | | | 351/208 |
| 2013/0016963 A1 | 1/2013 | Miller | |
| 2013/0331148 A1 | 12/2013 | Brough | |
| 2014/0376903 A1* | 12/2014 | Garber | G03B 11/041 |
| | | | 396/448 |
| 2015/0054935 A1* | 2/2015 | Muramatsu | G02B 21/24 |
| | | | 348/79 |

* cited by examiner

LENS CAP ADAPTER FOR IMAGE CAPTURE DEVICE

CROSS-REFERENCE TO RELATED APPLICATIONS

The present application claims priority from U.S. Provisional Application Ser. No. 62/068,551 for "LENS CAP ADAPTER FOR IMAGE CAPTURE DEVICE," filed on Oct. 24, 2014, the disclosure of which is incorporated herein by reference in its entirety.

TECHNICAL FIELD

The present document relates to adapters for connecting image capture devices, such as cameras or smartphones, to optical devices such as telescopes.

BACKGROUND

Many people enjoy viewing objects through optical devices such as telescopes, binoculars, and the like. Such optical devices can make it possible to view distant objects as though they were much closer to the user's position. Telescopes have grown popular for observing celestial objects and phenomena.

There are many instances in which it would be desirable for a user to capture an image of objects viewed through the optical device. Existing image capture solutions for optical devices such as telescopes are typically complex, and in many instances, require specialized camera equipment. Recently, mobile devices with cameras, such as smartphones, tablets, and phablets, have grown in popularity. Unfortunately, existing optical devices generally do not have a convenient interface for enabling them to cooperate with mobile devices.

SUMMARY

The present document describes an adapter that can be used to connect a camera, such as a smartphone, tablet, phablet, digital camera or analog camera, to an optical device such as a telescope, for the purpose of capturing an image through the optical device. In at least one embodiment, the adapter is implemented as part of an existing component or accessory of the optical device, such as a lens cap or lens cover, so that the user does not need to bring extra parts with them into the field. The adapter can be configured to fit a wide variety of smartphones with no extra parts required.

In some embodiments, the described adapter has many advantages over existing techniques and devices. For example:

The user need not purchase additional equipment, as the adapter can be built into an existing component of the optical system.

The user need not transport additional equipment, as the adapter can be built into a required component of the optical system.

The user need not remember to bring extra equipment, as the adapter resides on the optical system when not in use.

The device allows connection with virtually any image capture device with a simple mechanism that is easy to understand and adjust.

In addition to the above advantages, the described adapter is inexpensive, particularly since it leverages an existing part in its design (such as the lens cap). This makes it easy to include the adapter as a standard component with optical systems, making it less likely that users will misplace, lose, or forget the adapter.

BRIEF DESCRIPTION OF THE IMAGES

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DETAILED DESCRIPTION

According to various embodiments, a telescope system may be designed to permit attachment and positioning of a camera outside the telescope housing. This may facilitate image capture, and allow the telescope to be used with a variety of digital imaging systems. The manner in which this is accomplished will be shown and described subsequently.

Telescope System Configuration

Figure 1:
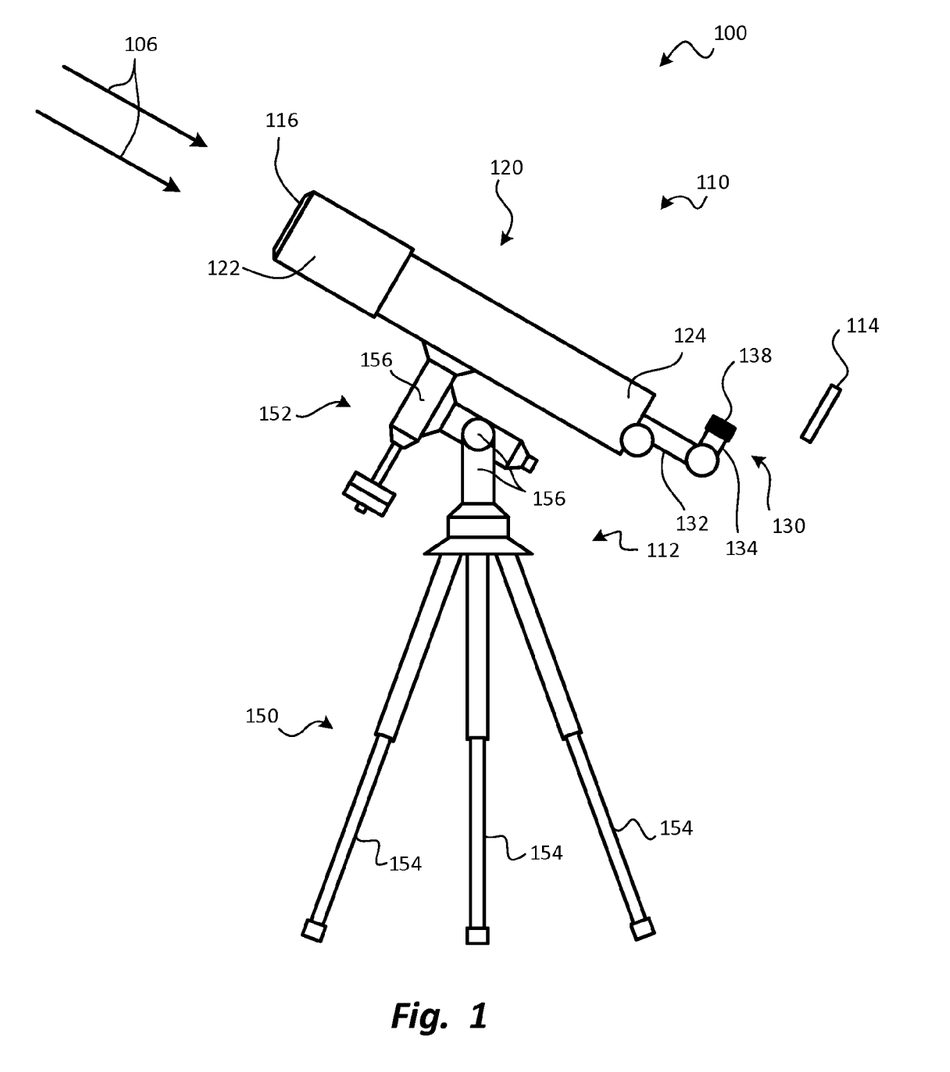
FIG. 1 is a side elevation view of a telescope system according to one embodiment.

Referring to FIG. 1, a side elevation view depicts an optical device in the form of a telescope system 100, according to one embodiment. In this application, an "optical device" may be any device that is designed to direct, capture, or otherwise manipulate light for viewing by a user. Thus, optical devices may include telescopes, binoculars, periscopes, cameras, lens attachments, and/or any other device that utilizes lenses, mirrors, and/or prisms to manipulate light. One exemplary optical device in the form of a telescope is sold by Applicant under the name of ASTROMASTER 90 EQ®.

The telescope system 100 of FIG. 1, which is merely exemplary, may be of a type suitable for viewing and/or photographing celestial bodies, or may be used for Earth-bound scientific observations or other purposes. In some embodiments, the telescope system 100 may be an astrograph suitable for capturing images of such celestial bodies. The images may be captured by receiving light 106, which may be extra-terrestrial light, and/or light from any other source.

As shown, the telescope system 100 may include multiple exemplary components. Such components may include, but need not be limited to, a telescope 110, a support 112, a camera 114, and an adapter 116. As shown in FIG. 1, the adapter 116 is positioned for use as a lens cap for the telescope 110. When in use to facilitate image capture through the telescope 110, the adapter 116 may be removed from the position shown and coupled to the opposite end of the telescope 110, as will be described subsequently. The telescope 110 may be supported by the support 112 at an orientation suitable for viewing and/or photographing the desired extra-terrestrial subject matter.

The telescope 110 may be used to view far-away objects, such as extra-terrestrial objects. Optionally, the camera 114 may be used to capture images of such extra-terrestrial subject matter, through the capture of light received by the telescope 110. In effect, the telescope 110 may act as a lens system for the camera 114. The camera 114 may be secured to the telescope 110 through the use of the adapter 116. All of these components will be shown and described in greater detail subsequently.

As shown, the telescope 110 may have a housing 120, which may have a generally tubular shape as shown, or in alternative embodiments, another suitable shape such as a square or rectangular cross-sectional shape. In this disclosure, a "housing" of an optical device is any element that houses or contains one or more optical components such as lenses and mirrors. A "generally tubular shape" need not be precisely tubular. For example, variations from cylindricity may exist on the interior surface and/or the exterior surface. Further, a generally tubular shape may have one or more taper elements, which may provide a conical shape, locally or for the object as a whole. The housing 120 may be sized to provide the desired aperture size so that the telescope 110 can capture sufficient light to generate bright, clear images with little vignetting, within a relatively short exposure period.

The housing 120 may have an aperture end 122 and a viewing end 124. The aperture end 122 may be oriented toward the subject matter to be viewed and/or imaged. Proximate the viewing end 124, the telescope 110 may have an eyepiece 130 coupled to the viewing end 124 of the housing 120 by a coupling 132. The eyepiece 130 may be designed such that an image of the light 106 captured by the telescope 110 is focused at the eyepiece 130. Thus, the user may view the image through the eyepiece 130. When in use to facilitate image capture through the telescope 110 with the camera 114, the adapter 116 may be positioned proximate the end of the telescope 110 at which the eyepiece 130 is located, and may further be attached to the eyepiece 130 and the camera 114, as will be shown and described subsequently.

The eyepiece 130 may have a body 134 with a generally tubular shape, which may be coupled to the coupling 132. The eyepiece 130 may be designed to be easily detached from the coupling 132, or may be permanently secured to the coupling 132. The eyepiece 130 may also have an eyeguard 138 coupled to the body 134. The eyeguard 138 may be formed of an elastomer such as rubber, and may have a shape designed to provide a cushion for the flesh surrounding the user's eye to help make the viewing process more comfortable and ergonomic.

The support 112 may have a base portion 150 and a telescope mounting portion 152. The base portion 150 may provide stable support for the telescope mounting portion 152, and thence, for the telescope 110. Thus, the base portion 150 may have multiple legs 154 that provide such stability. If desired, the legs 154 may be arranged to define a tripod or other known support structure. The telescope mounting portion 152 may have one or more joints 156 that can be adjusted to adjust the orientation of the telescope 110 relative to the support 112. The telescope mounting portion 152 may have one or more mounting features that mate with and/or are otherwise secured to the telescope 110, for example, via attachment to an accessory mount (not shown) or other support attachment feature of the telescope 110.

The joints 156 may be user-adjustable in a variety of ways. According to some embodiments, the joints 156 may be manually adjusted and fixed in their respective desired orientations with set screws or other fixation devices. In other embodiments, the joints 156 may be motor-driven. Stepper motors or other motors that provide fine control and locking capability may be used. Such motors may, if desired, be electronically controlled. Thus, the telescope 110 may automatically be aimed at celestial bodies that are of interest and/or kept aimed at such celestial bodies as the motion of the Earth causes them to shift in the sky. Keeping the telescope 110 properly oriented via automatic motion of the joints 156 of the telescope mounting portion 152 may be particularly helpful for capturing images with longer exposure times.

The adapter 116 of FIG. 1 may serve as a lens cap to cover the aperture end 122 of the housing 120 of the telescope 110. Additionally, the adapter 116 may be used to attach the camera 114 to the eyepiece 130 to enable relatively easy capture of images received through the telescope 110. Advantageously, the camera 114 need not have any particular configuration to enable it to be used in connection with the adapter 116. In some embodiments, the camera 114 may be a smartphone, tablet, phablet, film-based camera, digital camera, or any other image capture device. The camera 114 may be designed to capture still images and/or video. The adapter 116 will be described in greater detail in connection with FIGS. 2 through 6.

Adapter Configuration

Figure 2:
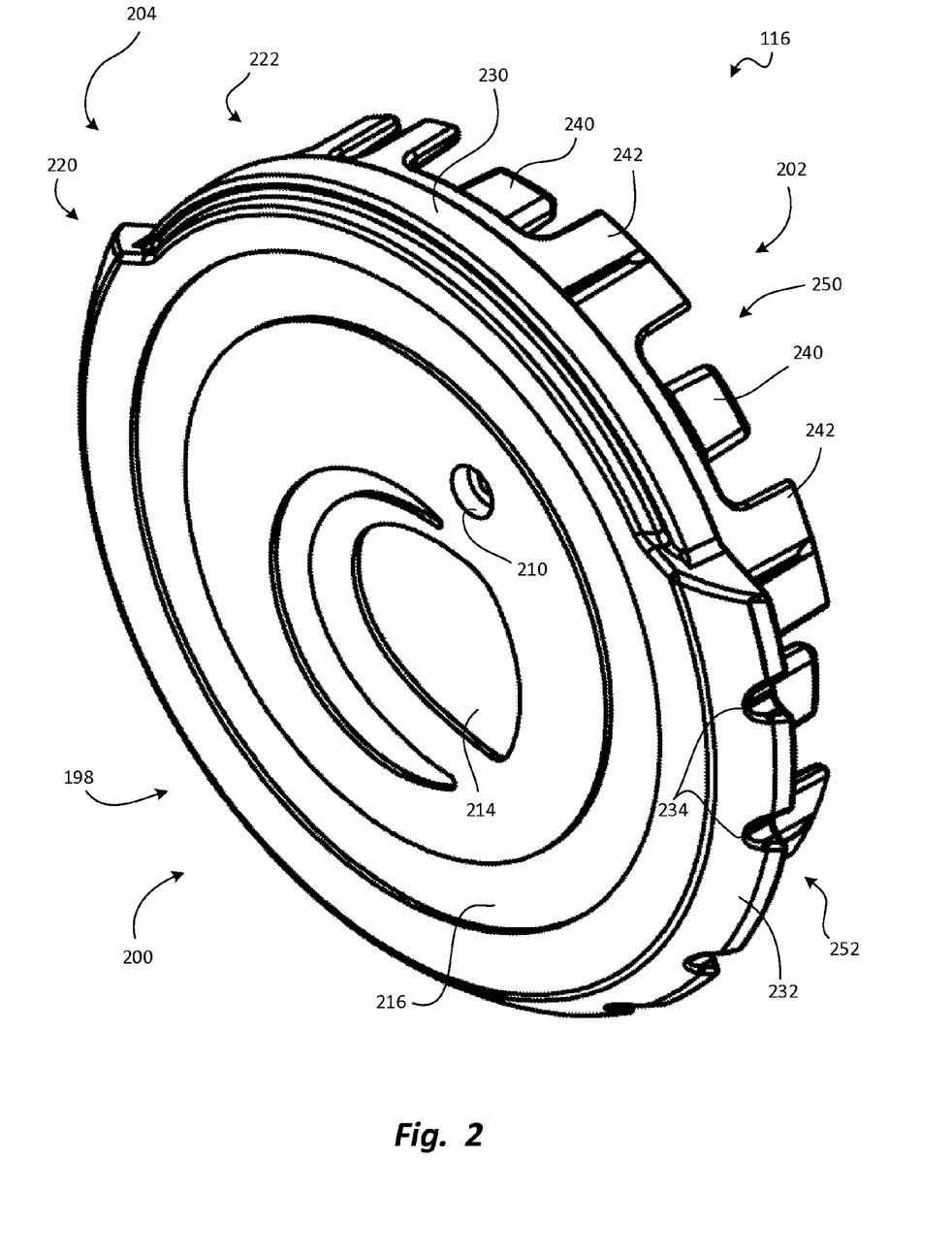
FIG. 2 is a perspective view depicting an exterior of the adapter of FIG. 1 in greater detail, according to one embodiment.

Referring to FIG. 2, a perspective view depicts an exterior of the adapter 116 of FIG. 1 in greater detail. As indicated previously, the adapter 116 may serve multiple functions. Specifically, the adapter 116 may act as a lens cap for the telescope 110, when attached to the aperture end of the housing 120, as illustrated in FIG. 1. Further, the adapter 116 may be used to attach the camera 114 to the telescope 110 to enable the camera 114 to be used to capture images of objects viewed through the telescope 110.

The adapter 116 may have a cover portion 198 with a generally discoid shape. The cover portion 198 may have an exterior surface 200 that faces away from the telescope 110 when the adapter 116 is attached to the telescope 110 as a lens cap, and an interior surface 202 that faces toward the telescope 110 when the adapter 116 is attached to the telescope 110 as a lens cap. Further, the adapter 116 may have a periphery 204 that connects the exterior surface 200 to the interior surface 202.

When in use to attach the camera 114 to the telescope 110, the camera 114 may be positioned on the exterior surface 200 of the adapter 116, as will be shown and described in detail subsequently. The exterior surface 200 may have a number of features that facilitate usage of the adapter 116 in such a manner. In at least one embodiment, the exterior surface 200 may have an imaging aperture 210, a logo 214, and/or a pad recess 216.

The imaging aperture 210 may be sized such that the lens of the camera 114, when placed adjacent to the imaging aperture 210, can receive light through the imaging aperture 210 without significant occlusion by the surrounding portions of the exterior surface 200. As mentioned previously, the camera 114 may be a smartphone, tablet, phablet, digital camera, analog camera, or the like. Many smartphones and tablets have the camera positioned on the back of the unit, toward the top. Thus, locating the imaging aperture 210 toward the periphery 204 of the adapter 116, as shown, may facilitate placement of the camera 114 proximate the center of the exterior surface 200, as will be shown subsequently.

When the adapter 116 is not being used to attach the camera 114 to the telescope 110 (such as when the adapter 116 is attached to the housing 120 as a lens cap), the imaging aperture 210 may optionally be blocked. In some embodiments, this may be done through the use of a plug (shown in FIGS. 5 and 6) that helps restrict the entry of dust or other foreign matter into the interior of the housing 120. A tether (also shown in FIGS. 5 and 6) may be attached to the plug and to the interior surface 202 to ensure that the plug does not get lost and remains proximate the interior surface 202 when it is not positioned to block the imaging aperture 210.

The logo 214 may identify the maker of the telescope 110, the camera 114, and/or the adapter 116. The logo 214 is optional and may be excluded and/or replaced with other features, if desired.

The pad recess 216 may have a generally annular shape, and may be recessed relative to the surrounding portions of the exterior surface 200. The pad recess 216 may be shaped to receive a pad (shown in FIG. 3) that cushions the interface between the camera 114 and the exterior surface 200 when the camera 114 is attached to the exterior surface 200. Alternatively or additionally, the adapter 116 can be recessed so as to assist in positioning the camera 114 correctly with respect to the imaging aperture 210.

As shown, the periphery 204 may have an exterior portion 220 adjacent to the exterior surface 200 and an interior portion 222 adjacent to the interior surface 202. The exterior portion 220 of the periphery 204 may define a periphery of the exterior surface 200, and the interior portion 222 of the periphery 204 may define a periphery of the interior surface 202.

The exterior portion 220 of the periphery 204 may have a smooth region 230 and a ridged region 232. The smooth region 230 may have a generally cylindrical surface, and the ridged region 232 may have cylindrical, conical, and/or dome shapes that cooperate to define a diameter larger than that of the smooth region 230. The ridged region 232 may have a plurality of notches 234 distributed along the edge of the ridged region 232.

The interior portion 222 of the periphery 204 may have a plurality of interior tabs 240 and a plurality of exterior tabs 242. The interior tabs 240 may be arranged in a circular pattern with an outside diameter that is close to the inside diameter of the housing 120 of the telescope 110. Similarly, the exterior tabs 242 may be arranged in a circular pattern larger than that of the interior tabs 240 to define an inside diameter that is close to the outside diameter of the housing 120 of the telescope 110. Thus, the interior tabs 240 and the exterior tabs 242 may cooperate to capture the end of the housing 120 to keep the adapter 116 in place on the housing 120. Accordingly, the interior tabs 240 and the exterior tabs 242 of the interior surface 202 of the adapter 116 may cooperate to define a housing attachment feature 250 that attaches the adapter 116 to the housing 120 of the telescope 110.

If desired, the interior tabs 240 may define a mild interference fit with the inside diameter of the housing 120. Additionally or alternatively, the exterior tabs 242 may define a mild interference fit with the outside diameter of the housing 120. Such interference fits may beneficially have an engagement/disengagement force high enough to keep the adapter 116 on the housing 120 during transportation, storage, and setup of the telescope 110, but low enough to enable a user to remove the adapter 116 from the housing 120 relatively easily by hand.

The housing attachment feature 250 is only one of many possible housing attachment features that may be used within the scope of the present disclosure. In alternative embodiments (not shown), a housing attachment feature may have only a rim, tabs, or the like that engage the interior surface of the telescope housing. In other alternative embodiments (not shown), a housing attachment feature may have only a rim, tabs, or the like that engage the exterior surface of the telescope housing. In yet other embodiments (not shown), an interference fit need not be used; rather, any of a variety of fastening devices known in the art may be used to secure the adapter to the housing.

The exterior tabs 242 and the notches 234 may cooperate to define a camera attachment feature 252 that attaches the camera 114 to the adapter 116. One manner in which this may be accomplished will be shown and described in connection with FIG. 3, as follows.

Figure 3:
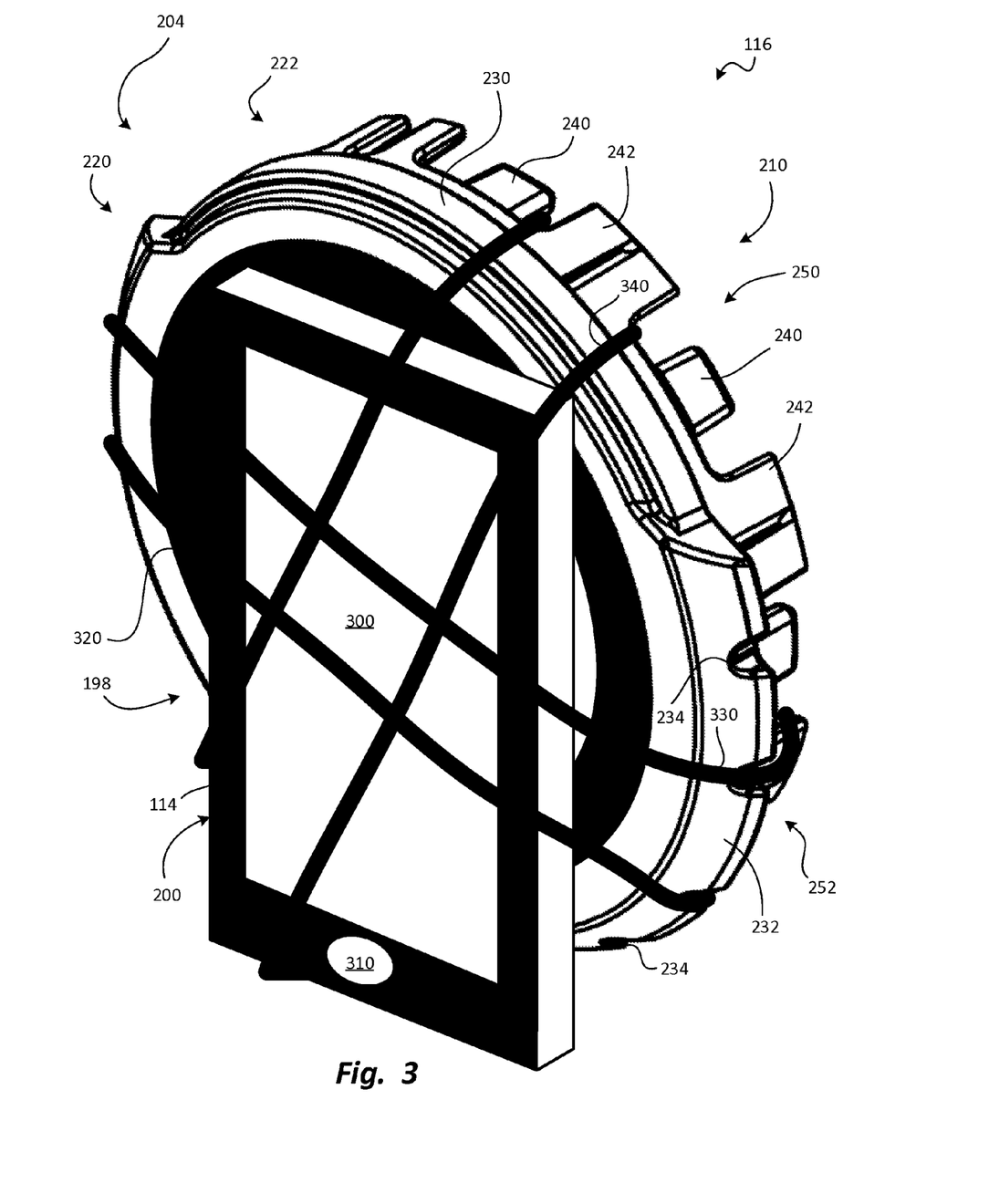
FIG. 3 is a perspective view depicting the exterior of the adapter of FIG. 1 after attachment of the camera to the adapter, according to one embodiment.

Referring to FIG. 3, a perspective view depicts the exterior of the adapter 116 of FIG. 1 after attachment of the camera 114 to the adapter 116, according to one embodiment. In the exemplary embodiment of FIG. 3, the camera 114 is a smartphone, tablet, or phablet, with a screen 300 and one or more controls 310 that can be used to control the operation of the camera 114. The camera 114 may have a lens on the opposite side of its housing from the screen 300, oriented toward the exterior surface 200 of the cover portion 198 and aligned with the imaging aperture 210 in the cover portion 198. The adapter 116 may advantageously be oriented horizontally when attached to the telescope 110 and the camera 114. Such an orientation may help keep the camera 114 in place on the exterior surface 200 of the adapter 116.

FIG. 3 also illustrates the presence of a pad 320 of the adapter 116, which may be positioned to reside in the pad recess 216 on the exterior surface 200. The pad 320 may be formed of a flexible material such as an elastomer, and may have an annular shape with a thickness sufficient to cause the pad 320 to protrude above the portion of the exterior surface 200 that surrounds the pad recess 216. Thus, the camera 114 may rest primarily or exclusively on the pad 320. This may help to provide for secure attachment of the camera 114 to the adapter 116, and help avoid any damage to the housing of the camera 114. In at least one embodiment, the pad 320 can be recessed so as to assist in positioning the camera 114 correctly with respect to the imaging aperture 210.

The adapter 116 may have gripping members that cooperate with the camera attachment feature 252 to grip the camera 114 against the adapter 116. More specifically, the gripping members may be a first elastic member 330 and a second elastic member 340, which may be used to secure the camera 114 to the exterior surface 200 of the adapter 116 with the aid of the camera attachment feature 252. The first elastic member 330 and the second elastic member 340 may be rubber bands or the like.

The first elastic member 330 and the second elastic member 340 may each have a loop configuration, and may each have some elasticity so that they can stretch to facilitate attachment of the camera 114 to the adapter 116. The resulting tension in the first elastic member 330 and the second elastic member 340 may cause the first elastic member 330 and the second elastic member 340 to exert force tending to urge the camera 114 against the exterior surface 200 of the adapter 116. The ends of the first elastic member 330 and the second elastic member 340 may each be looped around the exterior tabs 242 on opposite sides of the interior portion 222 of the periphery 204 of the adapter 116.

Both ends of the first elastic member 330 may traverse the ridged region 232 of the interior portion 222 of the periphery 204. The portions of the first elastic member 330 adjacent to the ends of the first elastic member 330 may pass through the notches 234 of the region 232, which may help to keep the first elastic member 330 in place. On the ridged region 232, each pair of the notches 234 may optionally be aligned with the edges of one of the exterior tabs 242 so that the portions of the first elastic member 330 adjoining the end looped around the exterior tab 242 tend to naturally fall into the notches 234 adjacent to the exterior tabs 242.

One end of the second elastic member 340 may traverse the ridged region 232 of the interior portion 222 of the periphery 204, and the other end of the second elastic member 340 may traverse the smooth region 230 of the interior portion 222 of the periphery 204. The portions adjoining the end of the second elastic member 340 that traverses the ridged region 232 may pass through and be retained by the notches 234 adjacent to the exterior tab 242 around which it is looped. However, the end of the second elastic member 340 that traverses the smooth region 230 may not pass through notches 234, since the notches 234 are not present on the smooth region 230. The notches 234 may be helpful to keep the first elastic member 330 and the second elastic member 340 in place, but are not required. In alternative implementations, one or more ends of the first elastic member 330 and the second elastic member 340 may be looped around one or more of the interior tabs 240, in place of looping them around the exterior tabs 242.

In some embodiments, the notches 234 may be omitted. Further, in some embodiments, the camera attachment feature 252 may have a different configuration. For example, in alternative embodiments (not shown), a camera attachment feature may have one or more features such as hooks, tabs, posts, or other projections that can facilitate attachment of elastic members or the like. In other alternative embodiments, mechanical fasteners such as grippers, clamps, screws, nuts, or bolts may be used. Such fasteners may be used in conjunction with elastic members and/or other gripping members.

In some embodiments (not shown), gripping members different from elastic members may be used. For example, a relatively rigid arm or the like may span the exterior surface 200 and may be retained at both ends by fasteners or other camera attachment features positioned proximate the periphery of the exterior surface 200. Such an arm may have interior padding or the like, to help cushion, and yet firmly urge, the camera 114 toward the exterior surface 200. Multiple such arms may be used.

The first elastic member 330 and the second elastic member 340 may be coupled to the adapter 116, or more specifically, to the camera attachment feature 252, and the camera 114 by stretching and thus applying compressive force to the camera 114 and the adapter 116. In alternative embodiments (not shown), such stretching may not occur. For example, one or more gripping members may be attached to an adapter and/or a camera through the use of other attachment methods such as magnets, Velcro, zippers, nuts, bolts, screws, adhesives, clamps, and/or the like. Numerous other attachment mechanisms may be used, as would be recognized by a person of skill in the art, with the aid of the present disclosure.

In other alternative embodiments (not shown), a transparent plate may be placed over the majority, or over substantially all of the exposed rear surface, of the camera 114 and urged toward the exterior surface 200 with fasteners, rubber bands, or the like to urge the camera 114 toward the exterior surface 200. In still other alternative embodiments (not shown), various brackets or other features may be secured to the exterior surface 200, or may be formed as a single piece with the exterior surface 200, to directly hold the camera 114 in contact with the adapter 116, or more specifically, with the pad 320.

Notably, the use of multiple gripping members is not required. Specifically, referring to the first elastic member 330 and the second elastic member 340 of FIG. 3, either the first elastic member 330 or the second elastic member 340 may optionally be omitted. Either of the first elastic member 330 and the second elastic member 340 may provide sufficient gripping force to hold the camera 114 against the pad 320. Use of both the first elastic member 330 and the second elastic member 340 may provide more secure attachment of the camera 114 to the adapter 116. As indicated previously, the adapter 116 may be oriented horizontally (i.e., with the exterior surface 200 in a substantially horizontal orientation). This may cause the first elastic member 330 and the second elastic member 340 to bear little or none of the weight of the camera 114 on the adapter 116.

In some embodiments (not shown), multiple gripping members may be used. For example, the adapter 116 may have third, fourth, and/or fifth, elastic members, etc. (not shown), which may be attached to other locations on the periphery 204 of the adapter 116 and retained by the exterior tabs 242 in a manner similar to that of the first elastic member 330 and the second elastic member 340.

The interior surface 202 of the adapter 116 may be used to secure the adapter 116 and the camera 114 to the telescope 110 to enable the camera 114 to capture images of objects viewed through the telescope 110. This will be described in connection with FIGS. 4, 5, and 6, as follows.

Figure 4:
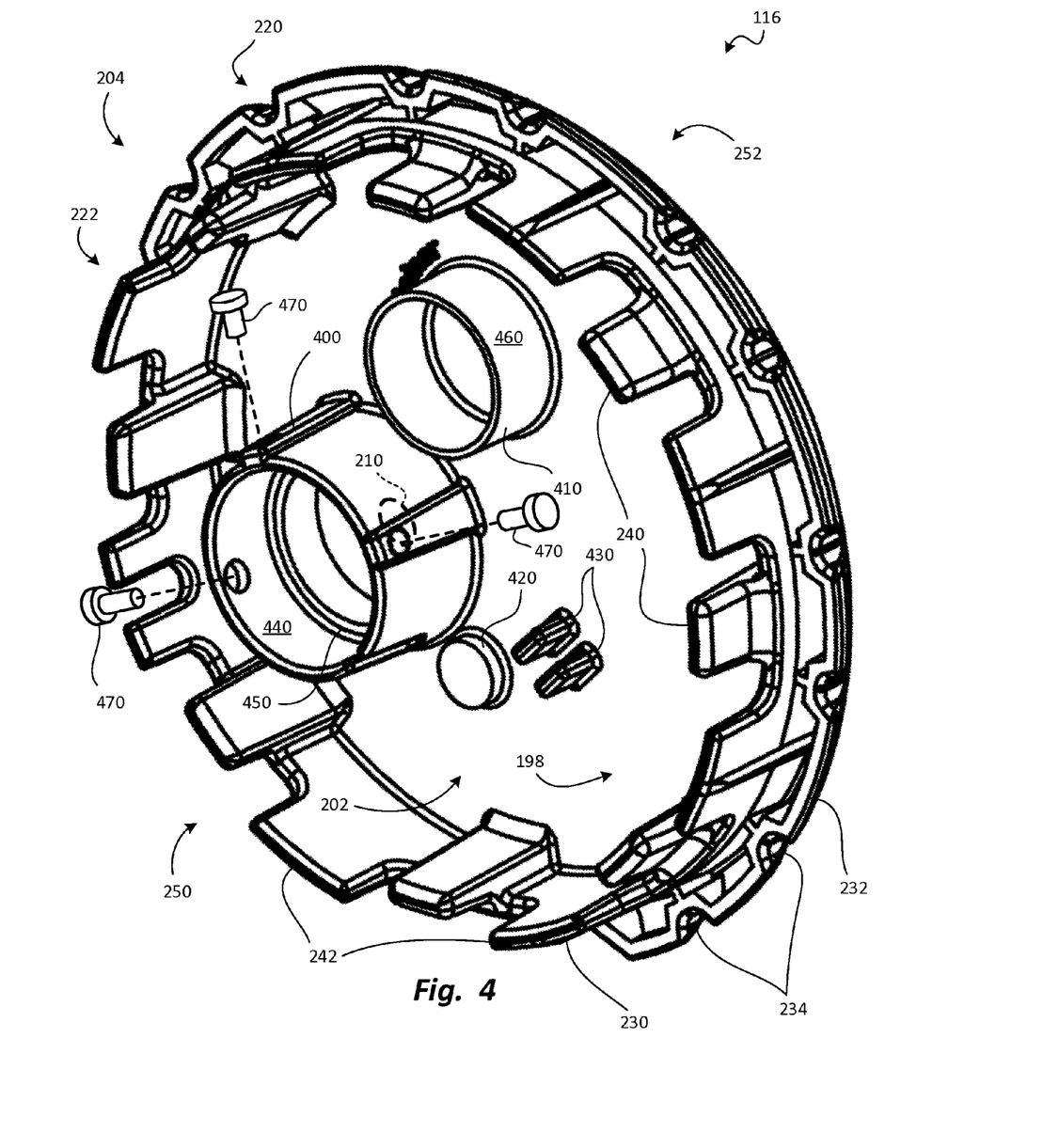
FIG. 4 is a perspective view depicting an interior of the adapter of FIG. 1 in greater detail, according to one embodiment.

Referring to FIG. 4, a perspective view depicts an interior of the adapter 116 of FIG. 1 in greater detail, according to one embodiment. As shown, the interior surface 202 of the adapter 116 may have a number of features that facilitate attachment of the adapter 116 to the telescope 110 in a manner that facilitates use of the camera 114 to capture images through the telescope 110. In the exemplary embodiment of FIG. 4, the interior surface 202 may be configured to facilitate attachment of the adapter 116 to the eyepiece 130 of the telescope 110. The interior surface 202 may thus have an eyepiece attachment feature 400, a tether attachment boss 420, and a plug retention feature in the form of a pair of plug retention projections 430.

The eyepiece attachment feature 400 may be configured to attach the adapter 116 to the eyepiece 130 of the telescope 110, or more specifically, to the body 134 of the eyepiece 130. As embodied in FIG. 4, the eyepiece attachment feature 400 may have a generally tubular shape with an interior surface 440 sized such that the body 134 of the eyepiece 130 is insertable into the interior of the eyepiece attachment feature 400. The interior surface 440 of the eyepiece attachment feature 400 may define a mild interference fit with the exterior, generally cylindrical surface of the body 134 of the eyepiece 130 to provide an engagement/disengagement force high enough to retain the body 134 in the eyepiece attachment feature 400 during usage of the camera 114 to capture images through the telescope 110, but low enough to enable a user to remove the body 134 from the eyepiece attachment feature 400 relatively easily by hand.

The generally tubular shape of the eyepiece attachment feature 400 may be coaxial with the imaging aperture 210, so that the imaging aperture 210 is centered within the generally circular expanse of the interior surface 202 that is within the eyepiece attachment feature 400. Thus, upon insertion into the eyepiece attachment feature 400, the body 134 of the eyepiece 130 will be properly aligned with the imaging aperture 210.

The eyepiece attachment feature 400 may have a countersink 450 that defines a smaller diameter than that of the interior surface 440. The countersink 450 may be small enough to interfere with insertion of the body 134 beyond the countersink 450, thus ensuring that a gap of predictable size will remain between the end of the body 134 of the eyepiece 130, and the portion of the interior surface 202 that surrounds the imaging aperture 210. Consequently, the distance between the end of the body 134 of the eyepiece 130 and the lens (not shown) of the camera 114 may be predetermined. This may help to ensure that the images captured by the camera 114 through the use of the adapter 116 are properly focused. Further, one or more screws may be used to secure the eyepiece 130 to the eyepiece attachment feature 400. For example, two or more nylon thumbscrews 470 may be used, for example, by inserting their threaded portions through apertures in the wall of the eyepiece attachment feature until their ends abut the eyepiece 130 to keep it in place, in a manner similar to that of a set screw.

The eyepiece attachment feature 400 is only one of many possible eyepiece attachment features that may be used within the scope of the present disclosure. In other embodiments (not shown), various clips, clamps, and/or other fastening devices may be used to secure an eyepiece (or a part of an eyepiece) to an adapter. Such eyepiece attachment features need not have generally tubular shapes, but may instead have any shape capable of gripping the eyepiece. Further, in some alternative embodiments (not shown), an eyepiece attachment feature may protrude from an exterior surface, rather than an interior surface. In such a case, the camera may be attached to the interior surface.

The eyepiece attachment feature 400 may be sized to receive the body 134 of the eyepiece 130, without the eyeguard 138 attached. Retaining the body 134 without the eyeguard 138 may facilitate attachment of the body 134 to the eyepiece attachment feature 400. In any case, the eyeguard 138 is not needed for imaging with the adapter 116 because the user's eye will not abut the eyepiece 130. It may be advantageous for the adapter 116 to retain the eyeguard 138 separately from retention of the body 134 of the eyepiece 130 to ensure that the eyeguard 138 is not misplaced while it is detached from the body 134.

Thus, the eyeguard attachment feature 410 may be shaped to retain the eyeguard 138. In the exemplary embodiment of FIG. 4, the eyeguard attachment feature 410 may have a generally tubular shape with an exterior surface 460 that has a diameter similar to that of an exterior surface of the body 134 of the eyepiece 130. Thus, the eyeguard 138 may fit around the exterior surface 460 of the eyeguard attachment feature 410 in a manner similar to that of attachment of the eyeguard 138 to the body 134. This will be shown in FIG. 6. The eyeguard 138 may fit tightly enough on the eyeguard attachment feature 410 to keep the eyeguard 138 attached to the eyeguard attachment feature 410 during usage of the camera 114 for imaging through the telescope 110.

The eyeguard attachment feature 410 is only one of many possible eyeguard attachment features that may be used within the scope of the present disclosure. In other embodiments (not shown), various clips, clamps, and/or other fastening devices may be used to secure an eyeguard to an adapter. Such eyeguard attachment features need not have generally tubular shapes, but may instead have any shape capable of gripping, containing, and/or otherwise retaining the eyeguard.

Figure 5:
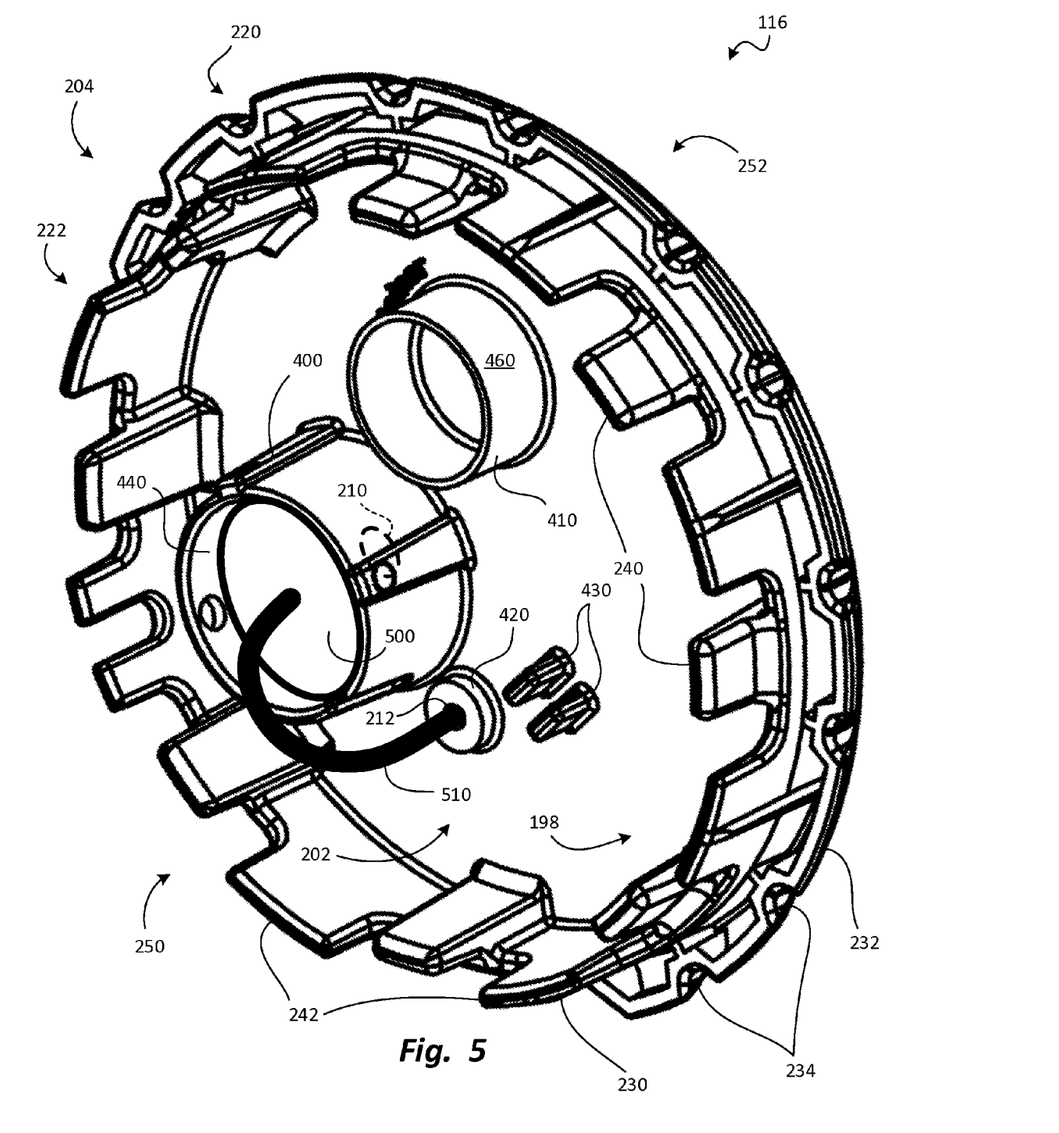
FIG. 5 is a perspective view depicting an interior of the adapter of FIG. 1 in greater detail, according to one embodiment, with a plug and tether in the eyepiece attachment feature.

The tether attachment boss 420 may receive the end of a tether attached to a plug that selectively blocks the eyepiece attachment feature 400, as will be shown in FIG. 5. The plug retention projections 430 may be used to retain the plug when it is not in the eyepiece attachment feature 400, as will be shown in FIG. 6.

Referring to FIG. 5, a perspective view depicts an interior of the adapter 116 of FIG. 1 in greater detail, according to one embodiment, with a plug 500 and tether 510 in the eyepiece attachment feature 400. FIG. 5 illustrates one possible configuration of the adapter 116 when the adapter 116 is attached to the housing 120 of the telescope 110 for use as a lens cap. The plug 500 may be used to form a barrier between the imaging aperture 210 and the interior of the housing 120, thereby ensuring that dust or other foreign matter is unable to enter the housing 120 through the imaging aperture 210.

The plug 500 may be generally discoid in shape, and may be formed of an elastomer such as rubber. The plug 500 may optionally be sized to form a seal with the interior surface 440 of the eyepiece attachment feature 400. Advantageously, the plug 500 may fit into the interior surface 440 with a mild interference fit so that the plug 500 can be easily inserted into and removed from the eyepiece attachment feature 400 by hand. Additionally or alternatively, the plug 500 may have a protrusion (not shown) that fits into the imaging aperture 210 with mild interference fit that generally performs the sealing function described above, and also provides for easy insertion and/or removal by hand, as also described above.

The tether 510 may have a first end secured to the tether attachment boss 420, and a second end secured to the plug 500. The first end of the tether 510 may have an enlarged portion (not shown) or other feature that is fastened, adhesive bonded, or otherwise secured to the tether attachment boss 420 to ensure that the tether 510 remains securely attached to the interior surface 202. The second end of the tether 510 may be bonded, fastened, or otherwise attached to the plug 500, or may be formed as a single piece with the plug 500. The tether 510 may ensure that the plug 500 is not misplaced when it is not captured by the eyepiece attachment feature 400.

Figure 6:
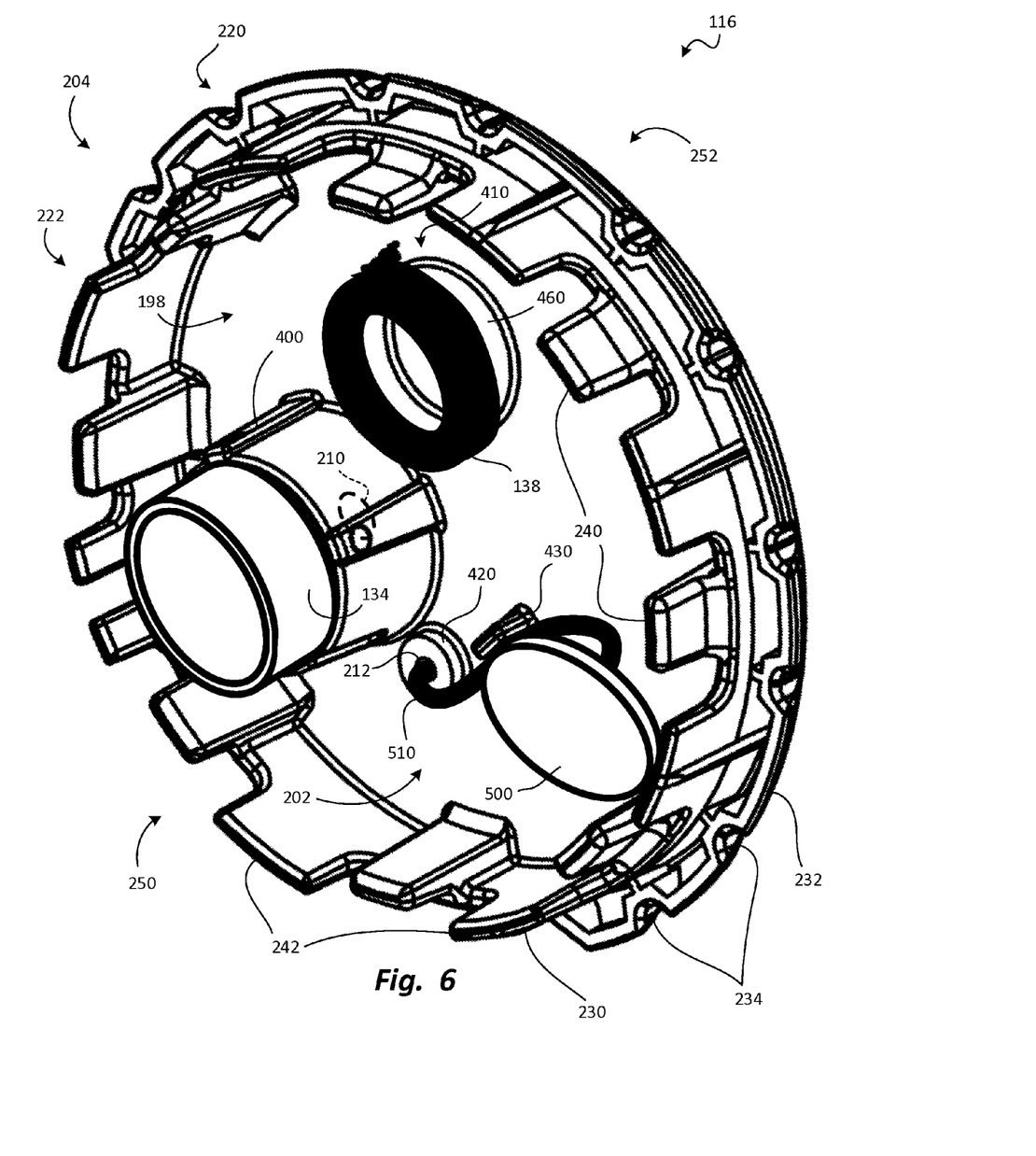
FIG. 6 is a perspective view depicting an interior of the adapter of FIG. 1 in greater detail, according to one embodiment, with the plug and tether removed from the eyepiece attachment feature, and with the body and eyeguard of the eyepiece retained in the eyepiece attachment feature and the eyeguard attachment feature, respectively.

Referring to FIG. 6, a perspective view depicts an interior of the adapter 116 of FIG. 1 in greater detail, according to one embodiment, with the plug 500 and tether 510 removed from the eyepiece attachment feature 400, and with the body 134 and eyeguard 138 of the eyepiece 130 retained in the eyepiece attachment feature 400 and the eyeguard attachment feature 410, respectively. The configuration of FIG. 6 may be ready for use in imaging through the telescope 110 with the camera 114.

As shown, the body 134 of the eyepiece 130 maybe retained within the generally tubular shape of the eyepiece attachment feature 400. The eyeguard 138 of the eyepiece 130 may be placed over the exterior surface 460 of the eyeguard attachment feature 410, as described previously. The plug 500 may be removed from the eyepiece attachment feature 400, and the central portion of the tether 510 may be inserted into the space between the plug retention projections 430 so that the plug retention projections 430 capture the central portion of the tether 510.

Thus, the plug 500 may be retained in a location away from the eyepiece attachment feature 400 to ensure that it does not interfere with the body 134 of the eyepiece 130 and/or the optical pathway in which the body 134 is to reside. In alternative embodiments, the plug 500 may, itself, be retained between the plug retention projections 430, for example, by inserting the edge of the plug 500 into the space between the plug retention projections 430 so that the edge is retained between the plug retention projections 430.

In some embodiments, the eyepiece 130 may be removable from the telescope 110. Such an embodiment is shown in FIG. 6. However, the adapter 116 may also be used in conjunction with telescopes with fixed eyepieces. In such embodiments (not shown), the eyepiece may not be removed from the telescope prior to attachment to the eyepiece attachment feature 400. Rather, the eyepiece may be attached to the eyepiece attachment feature 400 with the eyepiece still on the telescope.

Figure 7:
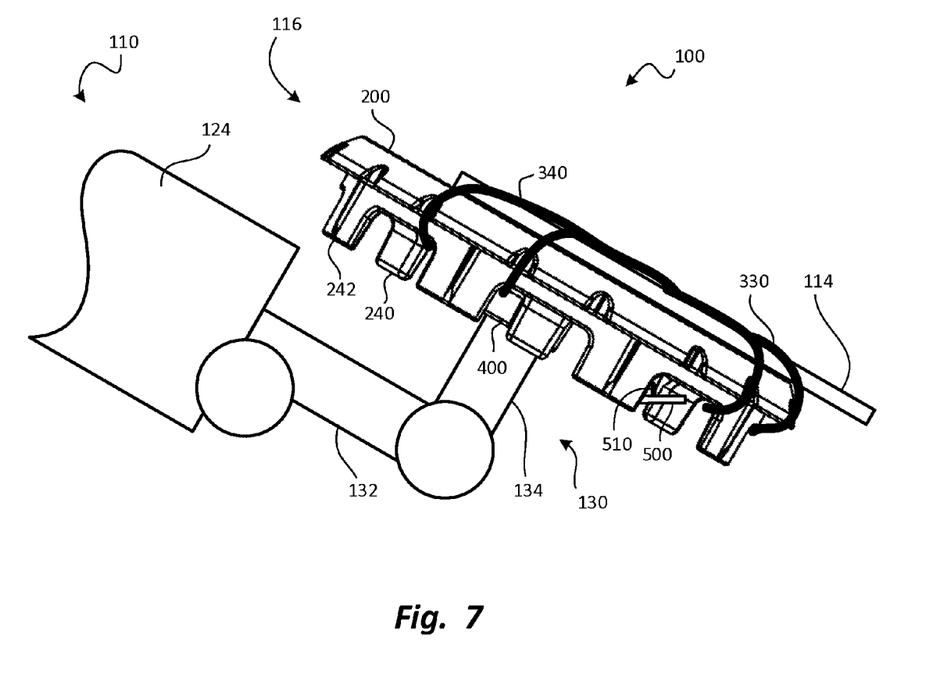
FIG. 7 is a side elevation view of a portion of the telescope system of FIG. 1, with the adapter in use to attach the camera to the eyepiece to enable imaging to be carried out with the camera through the telescope.

Referring to FIG. 7, a side elevation view illustrates a portion of the telescope system 100 of FIG. 1, with the adapter 116 used to attach the camera 114 to the telescope 110 to enable the camera 114 to be used for imaging through the telescope 110. As shown, the adapter 116 may be coupled to the body 134 of the eyepiece 130 via the eyepiece attachment feature 400.

The camera 114 may be positioned to rest on the exterior surface 200 of the adapter 116, or more specifically, on the pad 320 (not visible in FIG. 7). The camera 114 may be held in place on the exterior surface 200 through the use of the first elastic member 330 and the second elastic member 340, which may encircle the exterior tabs 242 on opposite sides of the adapter 116. The plug 500 may be positioned out of the eyepiece attachment feature 400, and may hang from the tether 510, out of the imaging path. The camera 114 may be aligned with the imaging aperture 210 (not shown in FIG. 7) so that the camera 114 can be used to capture images through the telescope 110.

Camera Attachment Method

Figure 8:
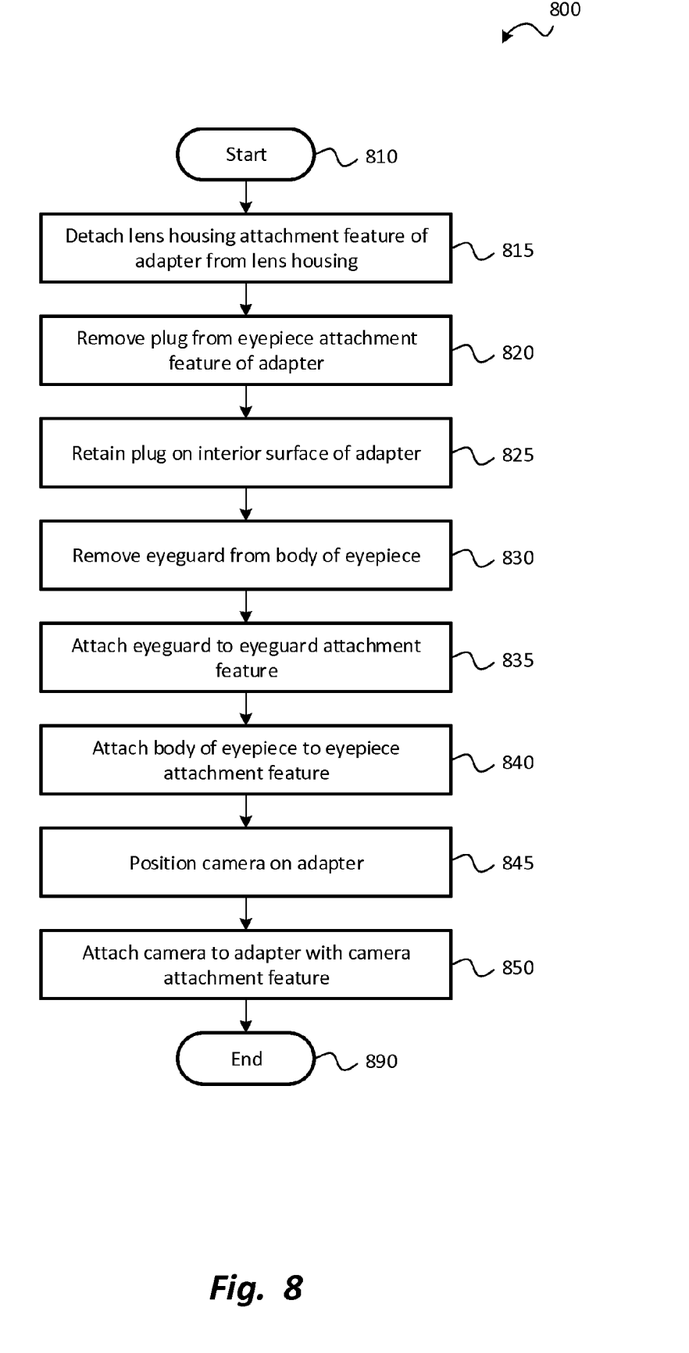
FIG. 8 is a flowchart diagram depicting a method of attaching a camera to a telescope through the use of an adapter, according to one embodiment.

Referring to FIG. 8, a flowchart diagram illustrates a method 800 of using an adapter according to one embodiment within the scope of the present disclosure. The method 800 will be described in connection with the telescope system 100, including the telescope 110 and the adapter 116 of FIGS. 1 through 6. However, the method 800 is not limited to the telescope system 100 of these figures, but may instead be used in connection with other optical devices and/or adapters according to various alternative embodiments. Further, the telescope system 100 of FIGS. 1 through 7 may be used in connection with other methods, according to various other alternative embodiments.

The telescope system 100 may initially be in a condition in which the adapter 116 is attached to the aperture end 122 of the housing 120 of the telescope 110, as illustrated in FIG. 1. The method 800 may start 810 with a step 815 in which the housing attachment feature 250 is detached from the housing 120 to detach the adapter 116 from the telescope 110. This may be accomplished, for example, by grasping the adapter 116 at the exterior portion 220 of the periphery 204 and pulling the adapter 116 axially away from the housing 120. As indicated previously, the interior tabs 240 and the exterior tab 242 may grip the housing 120 with a force selected such that the adapter 116 may be readily removable from the housing 120 by hand.

The exterior of the adapter 116 may then be as illustrated in FIG. 2, but with the pad 320 in place in the pad recess 216 as illustrated in FIG. 3. The interior of the adapter 116 may be as illustrated in FIG. 5, with the plug 500 retained in the eyepiece attachment feature 400 to keep dust and other foreign matter out of the housing 120.

In a step 820, the plug 500 may be removed from within the eyepiece attachment feature 400. This may be done, for example, by grasping the central portion of the tether 510, and pulling away from the interior surface 202 to pull the plug 500 out of the eyepiece attachment feature 400. This may also entail detaching the plug 500 from an interference fit with the eyepiece attachment feature 400 and/or the imaging aperture 210, as described above.

In a step 825, the plug 500 may be retained on the interior surface 202 of the adapter 116. This may be done, for example, by inserting the central portion of the tether 510 into the space between the plug retention projections 430. Alternatively, as mentioned previously, the plug 500 may be retained in a different manner, such as via insertion of the edge of the plug 500 into the space between the plug retention projections 430. The plug retention projections 430 may then retain the tether 510 and/or the plug 500, thereby ensuring that the plug 500 does not interfere with further steps in the process of attaching the camera 114 to the telescope 110, or with the process of capturing images with the camera 114 through the telescope 110. If desired, the plug retention projections 430 may retain the tether 510 with a mild interference fit that is strong enough to keep the tether 510 in place during use of the adapter 116 to capture images through the telescope 110, but not so strong as to make it difficult to remove the tether 510 from between the plug retention projections 430, for example, by pulling on the plug 500. Notably, the step 825 is optional; in the alternative to use of the tether 510, the plug 500 may be removed entirely from the adapter 116 and stored separately during use of the adapter 116 to conduct imaging through the telescope 110.

In a step 830, the eyeguard 138 may be removed from the body 134 of the eyepiece 130. This may be done by grasping the eyeguard 138 by hand, and pulling the eyeguard 138 away from the body 134. The eyeguard 138 may simply slide free of the body 134.

In a step 835, the eyeguard 138 may be attached to the eyeguard attachment feature 410. This may be done by grasping the eyeguard 138, aligning the open end of the eyeguard 138 with the eyeguard attachment feature 410, and then inserting the eyeguard 138 over the eyeguard attachment feature 410 so that the eyeguard 138 encircles the exterior surface 460 of the eyeguard attachment feature 410. Notably, the step 830 and the step 835 are optional. Specifically, not all eyepieces have eyeguards, and of those that do, some may be retainable with the eyepiece attachment feature 400 without removing the eyeguards. Further, if the eyepiece does have an eyeguard that is to be removed, such an eyeguard may be stored in a different manner. Hence, the eyeguard attachment feature 410 is an optional feature of the adapter 116.

In a step 840, the body 134 of the eyepiece 130 may be attached to the eyepiece attachment feature 400. This may be done by aligning the viewing end (i.e., the end through which the user looks, which was previously covered by the eyeguard 138) of the body 134 with the eyepiece attachment feature 400, and then inserting the body 134 into the interior of the eyepiece attachment feature 400. The body 134 may be pushed into the interior of the eyepiece attachment feature 400 until the viewing end of the body 134 abuts the countersink 450 within the eyepiece attachment feature 400. Fasteners such as the nylon thumbscrews 470 referenced previously may then be used to keep the eyepiece 130 in place in the interior of the eyepiece attachment feature 400.

The interior of the adapter 116 may then be in the configuration illustrated in FIG. 6. Specifically, the body 134 of the eyepiece 130 may be attached to the eyepiece attachment feature 400, the eyeguard 138 of the eyepiece 130 may be attached to the eyeguard attachment feature 410, and the plug 500 may be retained by the plug retention projections 430.

As mentioned previously, the eyepiece 130 may be removable from the remainder of the telescope 110, as illustrated in FIG. 6, or may not be removable. If the body 134 is not removable, the adapter 116 may already be secured to the remainder of the telescope 110. If the body 134 of the eyepiece 130 was previously removed from the remainder of the telescope 110 to facilitate insertion of the body 134 of the eyepiece 130 into the eyepiece attachment feature 400, the body 134 may again be attached to the remainder of the telescope 110 such that the adapter 116 is also attached to the remainder of the telescope 110 as well as to the body 134 of the eyepiece 130.

In a step 845, the camera 114 may be positioned on the adapter 116 for example, by positioning the camera 114 on the exterior surface 200 of the adapter 116. As indicated previously, the exterior surface 200 may be in a generally horizontal orientation after the performance of the previous steps. However, the exterior surface 200 may be inclined significantly depending on the subject matter at which the telescope 110 is directed. In the step 845, the camera 114 may be placed on the exterior surface 200 and/or the pad 320. If needed due to the presence of a significant incline in the orientation of the exterior surface 200, the camera 114 may be held, by hand, on the exterior surface 200 as further steps are performed.

In a step 850, the camera 114 may be attached to the adapter 116 through the use of the camera attachment feature 252. In the specific embodiment of FIGS. 1 through 6, this attachment may commence with anchoring a first end of the first elastic member 330 around one of the exterior tabs 242, drawing a second end of the first elastic member 330 across the camera 114, and then anchoring the second end to one of the exterior tabs 242 positioned generally diametrically opposed to the exterior tab 242 to which the first end is anchored. Then, a first end of the second elastic member 340 may be anchored around another one of the exterior tabs 242, and a second end of the second elastic member 340 may be drawn across the camera 114 and anchored to yet another of the exterior tabs 242 positioned generally diametrically opposed to the exterior tab 242 to which the first end is anchored.

Attachment of the camera 114 to the adapter 116 may then be complete, as illustrated in FIG. 3. The method 800 may then end 890. The camera 114 may be retained sufficiently securely to remain in place in the absence of deliberate manual positional adjustment.

If desired, the camera 114 may be adjusted to ensure that the lens of the camera 114 is properly aligned with the imaging aperture 210 of the cover portion 198 prior to attachment of the camera 114 to the adapter 116 with the camera attachment feature 252. This adjustment may be done, for example, by activating the camera feature of the camera 114 so that images captured by the lens of the camera 114 are shown on the screen 300. Then, the camera 114 may be moved on the exterior surface 200 of the adapter 116 until the field-of-view of the camera 114 (as observed by viewing the screen 300) is not occluded and is properly focused on the subject matter being viewed through the telescope 110.

This adjustment may optionally be carried out prior to performance of the step 850 to attach the camera 114 to the adapter 116. In the alternative, this adjustment may be carried out after attachment of the camera 114 to the adapter 116. The first elastic member 330 and the second elastic member 340 may be sufficiently flexible to permit the user to relatively easily shift the position of the camera 114 on the adapter 116, without detaching the first elastic member 330 and the second elastic member 340, until the proper alignment has been achieved.

The order of the various steps of the method 800 shown in FIG. 8 is merely exemplary; those of skill in the art will recognize that the steps of the method 800 may be reordered in numerous combinations. For example, in some embodiments, the camera 114 may be attached to the adapter 116 before attachment of the body 134 of the eyepiece 130 to the adapter 116. This may be done, for example, by performing the step 845 and the step 850 prior to performance of the step 820, the step 825, the step 830, the step 835, and the step 840. Further, any of the steps of the method 800 may be omitted, replaced, and/or supplemented with any additional steps that would be recognized by a person of skill in the art, operating with the benefit of the present disclosure.

Figure 9:
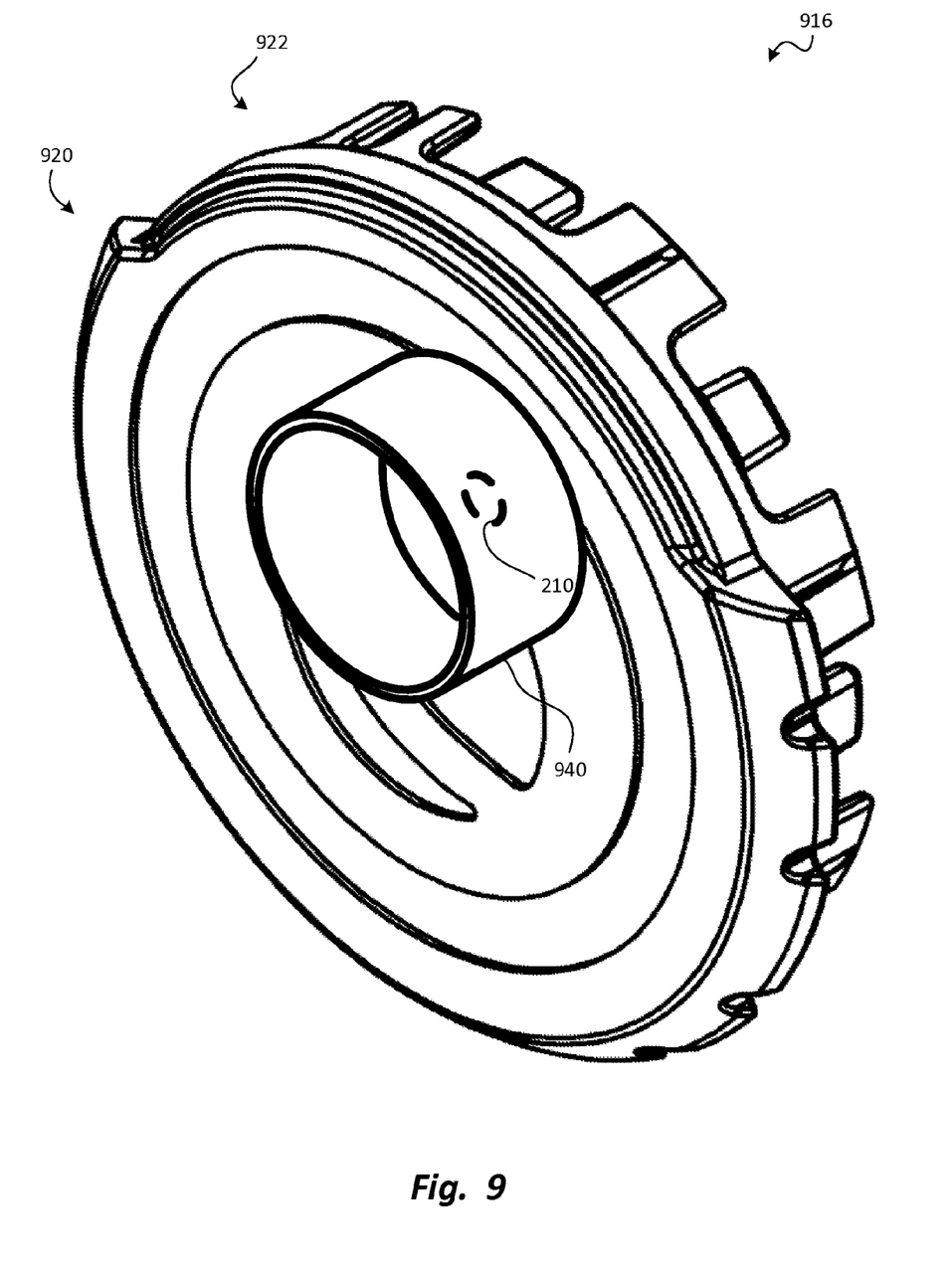
FIG. 9 is a perspective view depicting an exterior of an adapter according to one alternative embodiment.

Referring to FIG. 9, a perspective view depicts an exterior of an adapter 916 according to one alternative embodiment. The adapter 916 may have components generally similar to those of the adapter 116 of FIGS. 1 through 7. The adapter 916 may have an exterior surface 920 and an interior surface 922. An eyepiece attachment feature 940 with a generally tubular shape may be positioned on the exterior surface 920, proximate the imaging aperture 210. Thus, the body 134 of the eyepiece 130 may be secured to the exterior surface 920. If desired, the camera 114 may be secured to the interior surface 922. Thus, when assembled, the adapter 916 may be inverted, with the camera 114 resting on the interior surface 922.

The above description and referenced drawings set forth particular details with respect to possible embodiments. Those of skill in the art will appreciate that the techniques described herein may be practiced in other embodiments. First, the particular naming of the components or capitalization of terms is not mandatory or significant, and the mechanisms that implement the techniques described herein may have different names, formats, or protocols. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. An adapter for an optical device comprising an eyepiece and a housing within which one or more lenses and/or mirrors are retained, the adapter comprising:
    a cover portion sized to cover an end of the housing of the optical device, the cover portion comprising an imaging aperture;
    a housing attachment feature positioned at a periphery of the cover portion, wherein the housing attachment feature is configured to attach the cover portion to the housing;
    an eyepiece attachment feature independent of the housing attachment feature, wherein the eyepiece attachment feature is positioned proximate the imaging aperture and is configured to attach the adapter to the eyepiece; and
    one or more camera attachment features configured to facilitate attachment of a camera to the cover portion in alignment with the imaging aperture.

2. The adapter of claim 1, wherein the optical device comprises a telescope, wherein the housing comprises a housing diameter larger than an eyepiece diameter of the eyepiece;
    wherein the cover portion comprises:
    an interior surface that faces toward the optical device when the cover portion is attached to the housing; and
    an exterior surface that faces away from the optical device when the cover portion is attached to the housing;
    and wherein the eyepiece attachment feature protrudes from the interior surface.

3. The adapter of claim 2, wherein the eyepiece attachment feature comprises a generally tubular shape with an interior sized to receive the eyepiece;
    and wherein the eyepiece attachment feature is coaxial with the imaging aperture.

4. The adapter of claim 3, further comprising:
    a plug sized to be retained within the eyepiece attachment feature to removably cover the imaging aperture; and
    a tether comprising a proximal end secured to the interior surface, and a distal end secured to the plug;
    wherein the eyepiece attachment feature comprises a plurality of screws that secure the eyepiece within the generally tubular shape.

5. The adapter of claim 1, wherein the optical device comprises a telescope, wherein the housing comprises a housing diameter larger than an eyepiece diameter of the eyepiece;
    wherein the cover portion comprises:
    an interior surface that faces toward the optical device when the cover portion is attached to the housing; and
    an exterior surface that faces away from the optical device when the cover portion is attached to the housing;
    and wherein the eyepiece attachment feature protrudes from the exterior surface.

6. The adapter of claim 1, wherein the cover portion comprises:
    an interior surface that faces toward the optical device when the cover portion is attached to the housing; and
    an exterior surface that faces away from the optical device when the cover portion is attached to the housing;
    and wherein the camera attachment feature is configured to urge the camera toward the exterior surface.

7. The adapter of claim 6, wherein the one or more camera attachment features comprise a plurality of projections distributed about and protruding from the periphery of the cover portion to retain a gripping member such that the gripping member urges the camera toward the exterior surface.

8. The adapter of claim 7, further comprising the gripping member, wherein the gripping member comprises an elastic member having a length selected to enable the elastic member to span the exterior surface and to urge the camera toward the exterior surface.

9. The adapter of claim 6, further comprising a pad formed of an elastomeric material, secured to the exterior surface, and positioned such that the camera attachment feature grips the camera against the pad.

10. A method for coupling an optical device to a camera through use of an adapter, wherein the optical device comprises an eyepiece and a housing within which one or more lenses and/or mirrors are retained, wherein the adapter comprises a cover portion, a housing attachment feature, an eyepiece attachment feature, and one or more camera attachment features, the method comprising:
    with the adapter positioned such that the cover portion covers an end of the housing, detaching the housing attachment feature from the housing;
    attaching the eyepiece attachment feature to the eyepiece, wherein the eyepiece attachment feature is independent of the housing attachment feature; and
    using the one or more camera attachment features to attach the camera to the cover portion in alignment with an imaging aperture of the cover portion.

11. The method of claim 10, wherein the optical device comprises a telescope, wherein the housing comprises a housing with a diameter larger than an eyepiece diameter of the eyepiece;
    wherein the cover portion comprises:
    an interior surface that faces toward the optical device when the cover portion is attached to the housing; and
    an exterior surface that faces away from the optical device when the cover portion is attached to the housing;
    wherein the eyepiece attachment feature comprises a generally tubular shape, coaxial with the imaging aperture, that protrudes from the interior surface;
    and wherein attaching the eyepiece attachment feature to the eyepiece comprises inserting at least a portion of the eyepiece into an interior of the generally tubular shape.

12. The method of claim 11, wherein the adapter further comprises a plug and a tether secured to the plug and to the interior surface and the eyepiece attachment feature comprises a plurality of screws;
    and wherein the method further comprises:
    with the plug positioned within the eyepiece attachment feature to cover the imaging aperture, removing the plug from the eyepiece attachment feature; and
    with the tether, retaining the plug relative to the interior surface;
    wherein attaching the eyepiece attachment feature to the eyepiece comprises, after inserting at least a portion of the eyepiece into an interior of the generally tubular shape, securing the eyepiece within the generally tubular shape with the screws.

13. The method of claim 10, wherein the optical device comprises a telescope, wherein the housing comprises a housing with a diameter larger than an eyepiece diameter of the eyepiece;

wherein the cover portion comprises:
an interior surface that faces toward the optical device when the cover portion is attached to the housing; and
an exterior surface that faces away from the optical device when the cover portion is attached to the housing;
wherein the eyepiece attachment feature comprises a generally tubular shape, coaxial with the imaging aperture, that protrudes from the exterior surface;
and wherein attaching the eyepiece attachment feature to the eyepiece comprises inserting at least a portion of the eyepiece into an interior of the generally tubular shape.

14. The method of claim 10, wherein the cover portion comprises:
an interior surface that faces toward the optical device when the cover portion is attached to the housing; and
an exterior surface that faces away from the optical device when the cover portion is attached to the housing;
wherein using the one or more camera attachment features to attach the camera to the cover portion comprises using the camera attachment feature to urge the camera toward the exterior surface.

15. The method of claim 14, wherein the one or more camera attachment features comprise a plurality of projections distributed about and protruding from a periphery of the cover portion;
and wherein using the one or more camera attachment features to attach the camera to the cover portion comprises retaining a gripping member with the plurality of projections such that the gripping member urges the camera toward the exterior surface.

16. The method of claim 15, wherein the gripping member comprises an elastic member;
wherein using the camera attachment feature to urge the camera toward the exterior surface comprises, with the camera positioned on the exterior surface:
positioning the elastic member to span the exterior surface; and
retaining the elastic member such that the elastic member urges the camera toward the exterior surface.

17. The method of claim 14, wherein the adapter further comprises a pad formed of an elastomeric material and secured to the exterior surface;
and wherein using the one or more camera attachment features to attach the camera to the cover portion comprises gripping the camera against the pad with the camera attachment feature.

18. A system comprising:
a telescope comprising an eyepiece and a housing within which one or more lenses and/or mirrors are retained, wherein the housing comprises a housing diameter larger than an eyepiece diameter of the eyepiece; and
an adapter comprising:
a cover portion sized to cover an end of the housing of the telescope, the cover portion comprising an imaging aperture, wherein the cover portion comprises:
an interior surface that faces toward the telescope when the cover portion is attached to the housing; and
an exterior surface that faces away from the telescope when the cover portion is attached to the housing;
a housing attachment feature positioned at a periphery of the cover portion, wherein the housing attachment feature is configured to attach the adapter to the housing;
an eyepiece attachment feature that protrudes from the interior surface, coaxial with the imaging aperture, the eyepiece attachment feature comprising a generally tubular shape having an interior sized to receive the eyepiece; and
one or more camera attachment features that are configured to urge a camera toward the exterior surface, in alignment with the imaging aperture.

19. The system of claim 18, wherein the adapter further comprises an elastic member;
wherein the one or more camera attachment features comprise a plurality of projections distributed about and protruding from the periphery of the cover portion to retain the elastic member such that the elastic member urges the camera toward the exterior surface;
and wherein the elastic member has a length selected to enable the elastic member to span the exterior surface and to urge the camera toward the exterior surface when the elastic member is retained by a subset of the plurality of projections positioned on opposite sides of the periphery of the cover portion.

20. The system of claim 19, wherein the adapter further comprises:
a plug sized to be retained within the eyepiece attachment feature to removably cover the imaging aperture; and
a tether comprising a proximal end secured to the interior surface, and a distal end secured to the plug.

* * * * *